No. 722,931. PATENTED MAR. 17, 1903.
H. A. ADAMS.
SIDE DELIVERY HAY RAKE.
APPLICATION FILED MAR. 29, 1902.
NO MODEL. 2 SHEETS—SHEET 1.
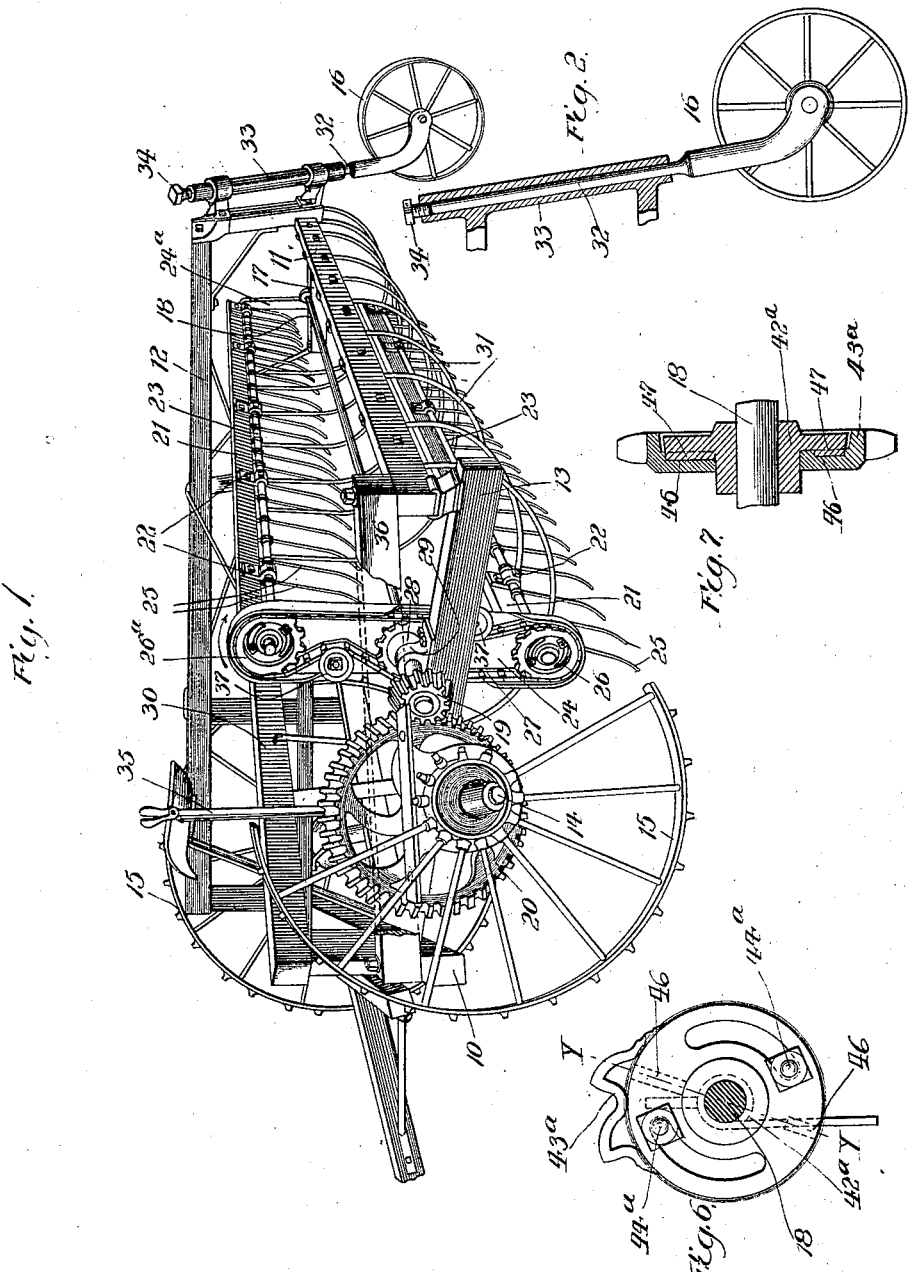
Witnesses:
Lute S. Alter.
Watson Hurlburt.
Inventor:
Henry A. Adams
By Louis T. Gibson
Attorney.

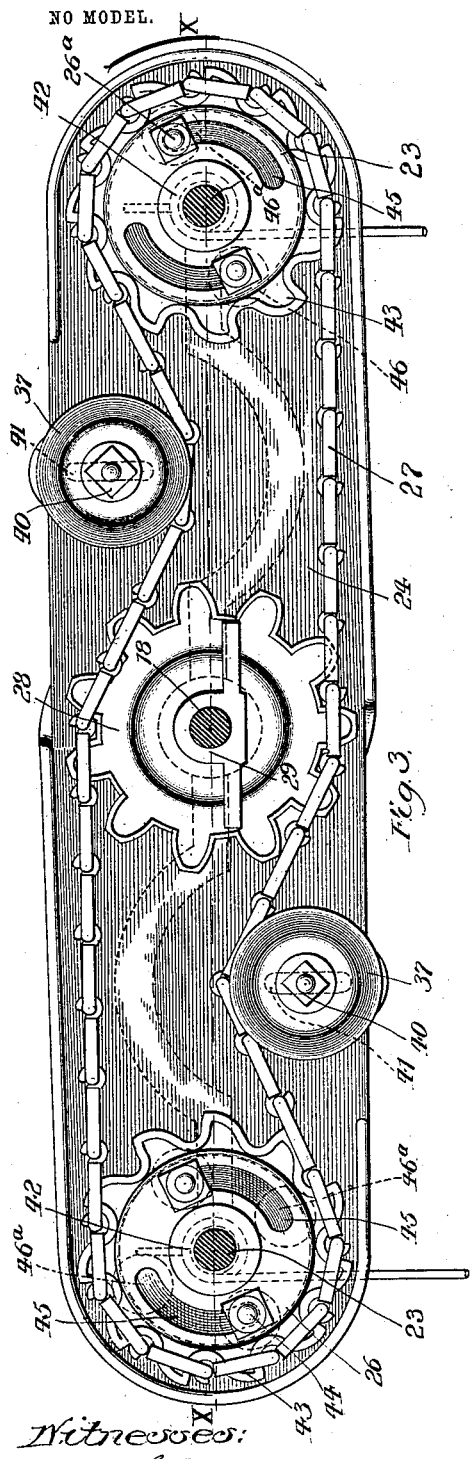

UNITED STATES PATENT OFFICE.

HENRY A. ADAMS, OF SANDWICH, ILLINOIS.

SIDE-DELIVERY HAY-RAKE.

SPECIFICATION forming part of Letters Patent No. 722,931, dated March 17, 1903.

Application filed March 29, 1902. Serial No. 100,634. (No model.)

*To all whom it may concern:*

Be it known that I, HENRY A. ADAMS, a citizen of the United States, and a resident of Sandwich, county of Dekalb, and State of Illinois, have invented certain new and useful Improvements in Side-Delivery Hay-Rakes, of which the following is a specification and which are illustrated in the accompanying drawings, forming a part thereof.
This invention relates to improvements in side-delivery hay-rakes—that is to say, rakes of that character which deliver the hay or grain at one side thereof in the form of continuous windrows parallel to the direction of movement of the machine.

The invention consists of the arrangement and combination of parts hereinafter fully described, particularly designated in the claims, and is illustrated in the accompanying drawings, in which—

Figure 1 is a perspective of a side-delivery rake constructed in accordance with my invention. Fig. 2 relates to a detail of the caster-wheel supporting the rear end of the rake-frame. Fig. 3 is a front elevation of one of the rotating cross-arms carrying the rakes. Fig. 4 is a section on the line $x\,x$ of Fig. 3. Fig. 5 is a sectional detail, partially in elevation, of the central shaft and stationary sprocket-wheel through the medium of which the planetary movement of the rakes is maintained. Fig. 6 illustrates a modification of the sprocket-wheels to which are fixed the rake-shafts, and Fig. 7 is a section on the line $y\,y$ of Fig. 6.

The supporting-frame of the machine may consist, as illustrated, of the front and rear beams or sills 10 and 11, respectively, and side beams 12 and 13, secured together or braced in any desired manner, the rear beam being at an angle with regard to the beam 10 and the side beam 12 being elevated above the front and rear beams of the frame in order to provide a suitable space in the frame for the rotating rake-frame hereinafter described.

The frame is mounted on an axle 14, provided with the usual carrying-wheels 15, and the rear thereof is supported by a caster-wheel 16.

Journaled at one end on the beam 13 and at the other on a stub-beam 17 at the opposite side of the frame of the machine, and, as shown, extending obliquely to the direction of movement of the machine, is a shaft 18, to which motion is imparted by a beveled pinion 19, driven by a bevel-gear 20, mounted on the axle 14.

Two rakes are employed and comprise the heads 21, located at opposite sides of and parallel to the shaft 18 and secured by clamps 22 to shafts 23, journaled on the opposite ends of cross-arms 24 24ª, which are fastened on the shaft 18, and the heads 21 are provided with teeth 25, which for greater security are turned about the shafts 23. The ends of the shafts 23 adjacent to the side beam 13 have keyed thereto sprockets 26 26ª, around which passes a chain 27, the said chain also passing at opposite sides of an intermediate stationary sprocket-wheel 28, which may be fixed to or made integral with the bearing 29, fastened to the beam 13 and in which one end of the shaft 18 is journaled.

The rake-teeth 25 are set in a substantially perpendicular position, and by reason of the relative motion of the shafts 23 with regard to the shaft 18, to which the heads carrying the rake-teeth are secured, the said teeth are always maintained in this position.

Secured to the rear beam 11 and a supplemental brace-beam 30 is a series of downwardly-curved guards 31, so related to the rake-teeth that the latter pass between the guards in their lowermost position and project below the same. These guards are designed to prevent the material from being lifted by the rake-teeth and to facilitate the delivery thereof to the side of the machine.

In order to adjust the rake-teeth with reference to the ground, the spindle 32 of the caster-wheel frame is fitted in a sleeve 33, secured to the rear end of the frame of the machine and the upper end of which is internally threaded to receive a bolt 34, against which the spindle abuts. By screwing the bolt 34 in or out the rear end of the frame may be raised or lowered at will.

Any suitable clutch mechanism controlled by the lever 35 may be employed for throwing the gear 20 out of action when the machine is not raking, and, if desired, an additional brace in the form of the side beam 36 may be employed to add to the rigidity of the supporting-frame.

In operation the rakes will be driven through the medium of the intermediate gearing in the direction indicated by the arrow, and the sprocket-chain 27, being carried bodily around the fixed sprocket 28, the shafts 23 will be held against rotation irrespective of the rotation of the cross-arms 24 24$^a$, the rakes having a planetary movement about the shaft 18, so that at whatever angle the rake-teeth may have been originally fixed that angularity will be maintained.

The teeth of the sprocket-wheels 26 26$^a$ are formed with abrupt shoulders opposed to the direction of travel of the rotatable rake-frame, which are designed to better overcome the resistance of the rake-teeth in dragging against the ground, and the other face of the teeth is rounded to permit the teeth to more readily enter and leave the links of the chain.

To prevent the sprocket-chain 27 from sagging away from the under side of the sprocket 28 when the cross-arm 24 is in a horizontal position, as seen in Fig. 3, idlers 37 are provided at diagonally-opposite edges of the cross-arm 24, over which the chain moves. In the constructions illustrated each idler is mounted on a sleeve 38, through which passes a bolt 39, between whose head and the sleeve the cross-bar is clamped by a nut 40, holding the idler in place. The bolts 39 pass through transverse slots 41, permitting lateral adjustment of the idlers to insure the proper tension on the chain 27.

To reduce the machine to its most compact form for shipping, the cross-arms 24 24$^a$ are turned so as to lie in a horizontal position, and when thus disposed the rake-teeth would normally point downward, rendering them liable to being broken off or bent out of shape from rough handling. To avoid this, the parts are so constructed that the rake-teeth may be turned out of the way or inwardly toward the shaft 18 without removing the sprocket-chain 27. To this end each of the sprocket-wheels 26 26$^a$ comprises an inner or hub section 42, in which one of the shafts 23 is fastened, and an outer or tooth section 43, the two sections of each sprocket being fastened together by bolts 44, passing through apertures at diametric points in the hub-section, and curved slots 45, alined with the apertures and located at opposite sides of the center of the sprocket and concentric therewith. The slots 45 are of such length that the hub-sections are limited to movement through ninety (90) degrees, and when the parts are in operative position the bolts 44 are located at the rear end of the slots with reference to the sense of rotation indicated by the arrow in Fig. 3, so that the strain on the sprockets due to the dragging of the rakes will be borne by the solid portions of the tooth-sections of the sprockets.

Referring particularly to Fig. 3, in order to swing the rake-teeth to the shipping position the bolts of the sprocket-wheel 26$^a$ are loosened and the hub-section turned until the bolts reach the other end of the slots, the rake-teeth then pointing inwardly, and maintained in that position by securing the bolts again. To similarly adjust the other rake, the bolts securing the two sections of the sprocket 26 together are removed and the hub-section given one-quarter turn to the left, thereby bringing each of the bolt-apertures of the hub-section into alinement with the adjacent end of the other curved slot, and the bolts are then inserted again and secured.

While I have shown the tooth-section of the sprocket-wheel 26 with slots, it will be obvious that the same results may be secured by providing apertures coinciding with the ends of the slots shown. This advantage results from the employment of the slots, however, that the rake-teeth of the sprocket 26 may be turned inwardly toward the machine or in the same direction as the rake-teeth of the sprocket 26$^a$ instead of toward the latter sprocket without separating the sprocket-sections, as is necessary when the apertures only are provided. It is preferred, however, for the greater protection of the rake-teeth to turn them inwardly, as first described.

To provide for the removal and insertion of the bolts 44 of the sprocket-wheel 26 when the rakes are being adjusted in the manner above explained, the cross-arm 24 is provided with apertures 46$^a$ back of the ends of the curved slots 45 of the said sprocket-wheel, while the opposite end of the cross-arm is provided with only a single pair of such apertures, the position of the bolts for securing the two sections of the other sprocket-wheel never being changed.

To restore the parts to their normal working position, the operation just described is reversed.

In Figs. 6 and 7 a modification of the sprockets 26 26$^a$ is illustrated. In this construction the tooth-section 43$^a$ is provided with recesses 46 at opposite sides of the shaft 18, designed to seat studs 47, projecting from the adjacent face of the hub-section 42$^a$. This arrangement provides positive shoulders to resist the strain on the sprockets and permits, in the case of the sprocket corresponding to 26 of the structure previously described, the securing-bolts 44$^a$ being located at the opposite end of the slots, so that the adjustment for shipping may be made without removing any of the bolts—that is to say, referring to Fig. 6, to turn the rake-teeth to the right or inwardly it is only necessary to loosen the nuts securing the bolts 44$^a$ and turn the hub-section until the bolts reach the end of the slots and then screw the nuts up again.

To insure the securing of the sprocket-sections in proper relation to each other when setting up the rake, one of the studs and its complementary recess are made longer than the other stud and its companion recess, as shown in Fig. 7.

I claim as my invention—

1. In a rake, in combination, a supporting-frame, a shaft journaled on the frame and provided with cross-arms, a stationary sprocket-wheel concentric with the shaft, a pair of rakes each having its head pivoted in the cross-arms, a sprocket-wheel to which each rake is secured and which rake is adjustable with relation thereto through ninety degrees, means for securing the rake in its adjusted position, and a chain turning over the sprocket-wheels and engaging the fixed sprocket-wheel.

2. In a rake, in combination, a supporting-frame, a shaft journaled on the frame and provided with cross-arms, a stationary sprocket concentric with the shaft, a pair of rakes pivoted to the opposite ends of the cross-arms, a sprocket-wheel to which each rake is fixed and comprising an inner or hub section and an outer or tooth section, one of which sections is provided with a slot concentric with the axis thereof, bolts passing through the other section and the said slot, and a sprocket-chain turning over the sprocket-wheels of the rakes and engaging the stationary sprocket-wheel.

3. In a rake, in combination, a supporting-frame, a shaft journaled on the frame, cross-arms fixed to the shaft, shafts journaled at opposite ends of the cross-arms, rake-heads clamped to the shafts, a sprocket fixed to each of said shafts and comprising an inner or hub section and an outer or tooth section, one of which sections is provided with a recess to receive a stud projecting from the other section, the tooth-section being provided with slots concentric with the axis thereof, bolts passing through the hub-section and the said slots, the said slots being of a length sufficient to permit of the turning of the hub-section through ninety degrees, and a sprocket-chain turning over the sprocket-wheels of the rakes and engaging the stationary sprocket-wheel.

4. In a rake, in combination, a supporting-frame, a shaft journaled on the frame and provided with cross-arms, means for transmitting motion to the shaft, a pair of rakes each having its head pivoted in one of the cross-arms, a wheel to which each rake is secured and which rake is angularly adjustable with relation thereto, means for securing the rake in its adjusted position, a stationary gear concentric with the shaft, and operative connection between the gear and the wheels to which the rakes are secured.

5. In a rake, in combination, a supporting-frame, a shaft journaled on the frame and provided with cross-arms, means for transmitting motion to the shaft, a stationary sprocket-wheel concentric with the shaft, a pair of rakes each having its head pivoted in the cross-arms, a sprocket-wheel to which each rake is secured and which rake is angularly adjustable with relation thereto, means for securing the rake in its adjusted position, and a chain turning over the sprocket-wheels and engaging the fixed sprocket-wheel.

6. In a rake, in combination, a supporting-frame, a shaft journaled on the frame and provided with cross-arms, a stationary sprocket concentric with the shaft, a pair of rakes pivoted to the opposite ends of the cross-arms, a pair of sprocket-wheels each of which comprises an outer or tooth section and an inner or hub section in which one of the rakes is fixed and which is adjustable with relation to its companion tooth-section.

HENRY A. ADAMS.

Witnesses:
JOHN R. WILLSON,
H. W. DICUS.